(12) United States Patent
King

(10) Patent No.: US 9,974,384 B1
(45) Date of Patent: May 22, 2018

(54) SHOPPING CART DESK

(71) Applicant: Wayne King, Huntsville, AL (US)

(72) Inventor: Wayne King, Huntsville, AL (US)

( * ) Notice: Subject to any disclaimer, the term of this patent is extended or adjusted under 35 U.S.C. 154(b) by 0 days. days.

(21) Appl. No.: 15/478,373

(22) Filed: Apr. 4, 2017

(51) Int. Cl.
*B62B 3/14* (2006.01)
*A47B 23/00* (2006.01)
*A47F 13/00* (2006.01)
*A47B 23/06* (2006.01)

(52) U.S. Cl.
CPC ............ *A47B 23/001* (2013.01); *A47B 23/06* (2013.01); *A47F 13/00* (2013.01); *B62B 3/1468* (2013.01)

(58) Field of Classification Search
CPC . A47B 23/001; A47B 23/06; A47B 2300/008; A47B 3/002; A47B 3/08; A47B 31/06; A47F 13/00; B62B 3/1468; B62B 3/1472; B62B 3/1476
See application file for complete search history.

(56) References Cited

U.S. PATENT DOCUMENTS

| | | | |
|---|---|---|---|
| 2,472,962 A * | 6/1949 | Shuflin | A47B 3/08 108/131 |
| 3,073,057 A | 1/1963 | Farber | |
| 4,034,539 A | 7/1977 | Economy | |
| 4,274,567 A | 6/1981 | Sawyer | |
| 4,643,280 A | 2/1987 | Hensley | |
| 4,901,901 A | 2/1990 | Reitenour | |
| 5,489,120 A * | 2/1996 | Thornsburg | B42D 5/042 281/29 |
| 5,505,142 A * | 4/1996 | Fink | A47B 3/08 108/129 |
| D583,123 S | 12/2008 | Cassin, III | |
| 8,651,031 B1 * | 2/2014 | Pazhoor | E04H 1/1255 108/115 |
| 9,126,616 B2 * | 9/2015 | Crum | B26B 5/00 |
| D760,464 S | 6/2016 | Dyer | |
| 2009/0071380 A1 * | 3/2009 | Chen | A01K 13/00 108/12 |
| 2009/0194007 A1 * | 8/2009 | Pearson | A47B 3/08 108/116 |

* cited by examiner

*Primary Examiner* — Daniel J Rohrhoff

(57) ABSTRACT

The shopping cart desk is a portable desk that can be used with a shopping cart. The shopping cart desk can be stored and carried in a ring binder along with shopping coupons, frequent shopper/customer loyalty cards, paper, writing utensils, and other organizational accessories. For use, the shopping cart desk may be removed from the binder and legs may be deployed from within the desk. The desk may then be placed in or near the child seat of a shopping cart to provide a workspace and access to coupons.

18 Claims, 6 Drawing Sheets

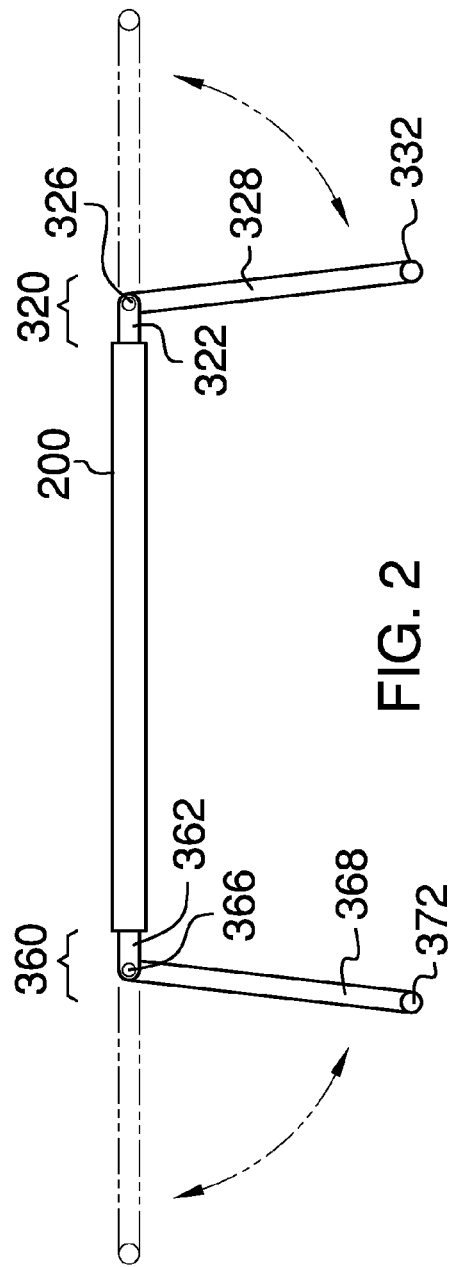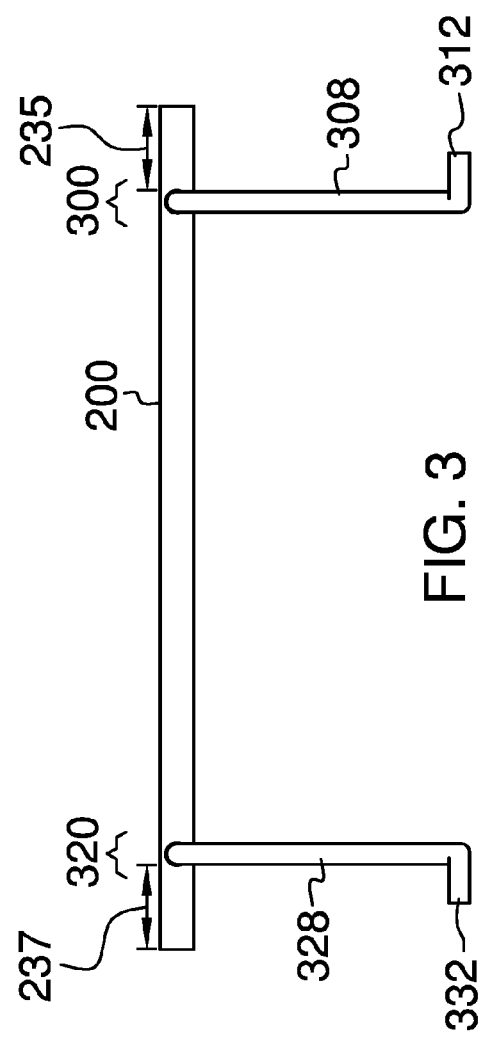

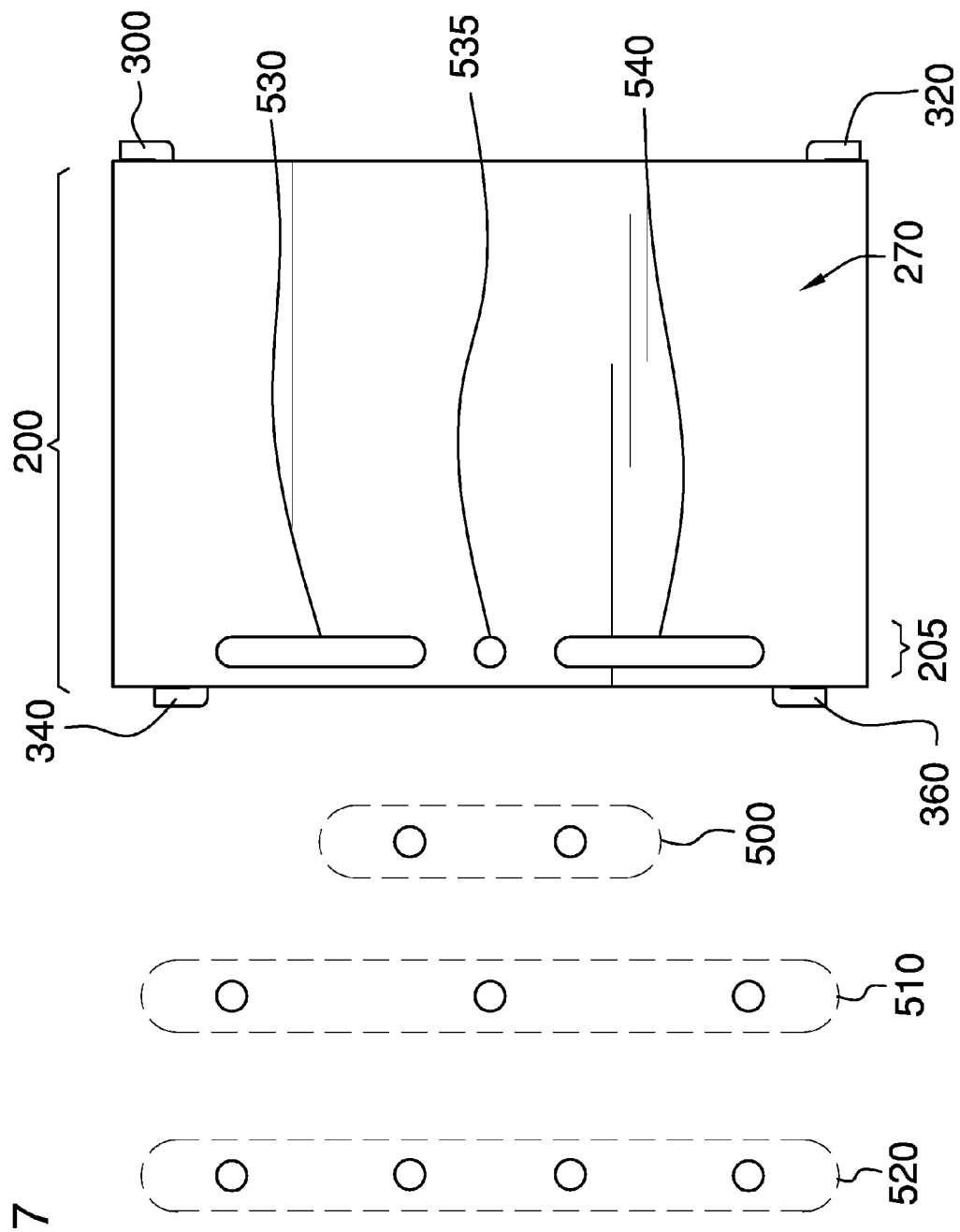

SHOPPING CART DESK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of portable desks, more specifically, a portable desk intended for use on a shopping cart.

SUMMARY OF INVENTION

The shopping cart desk is a portable desk that can be used with a shopping cart. The shopping cart desk can be stored and carried in a ring binder along with shopping coupons, frequent shopper/customer loyalty cards, paper, writing utensils, and other organizational accessories. For use, the shopping cart desk may be removed from the binder and legs may be deployed from within the desk. The desk may then be placed in or near the child seat of a shopping cart to provide a workspace and access to coupons.

An object of the invention is to provide a portable desk with a workspace that may be used on a shopping cart.

Another object of the invention is to provide a portable desk that may be stored and carried inside of a ring binder.

Yet another object of the invention is to provide a desk with legs that deploy from within the desk.

These together with additional objects, features and advantages of the shopping cart desk will be readily apparent to those of ordinary skill in the art upon reading the following detailed description of the presently preferred, but nonetheless illustrative, embodiments when taken in conjunction with the accompanying drawings.

In this respect, before explaining the current embodiments of the shopping cart desk in detail, it is to be understood that the shopping cart desk is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shopping cart desk.

It is therefore important that the claims be regarded as including such equivalent construction insofar as they do not depart from the spirit and scope of the shopping cart desk. it is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a side view of an embodiment of the disclosure.

FIG. 3 is a front side view of an embodiment of the disclosure.

FIG. 7 is a detail view of an embodiment of the disclosure illustrating placement of holes for various multi-ring binder standards.

DETAILED DESCRIPTION OF THE EMBODIMENT

Figure 1:
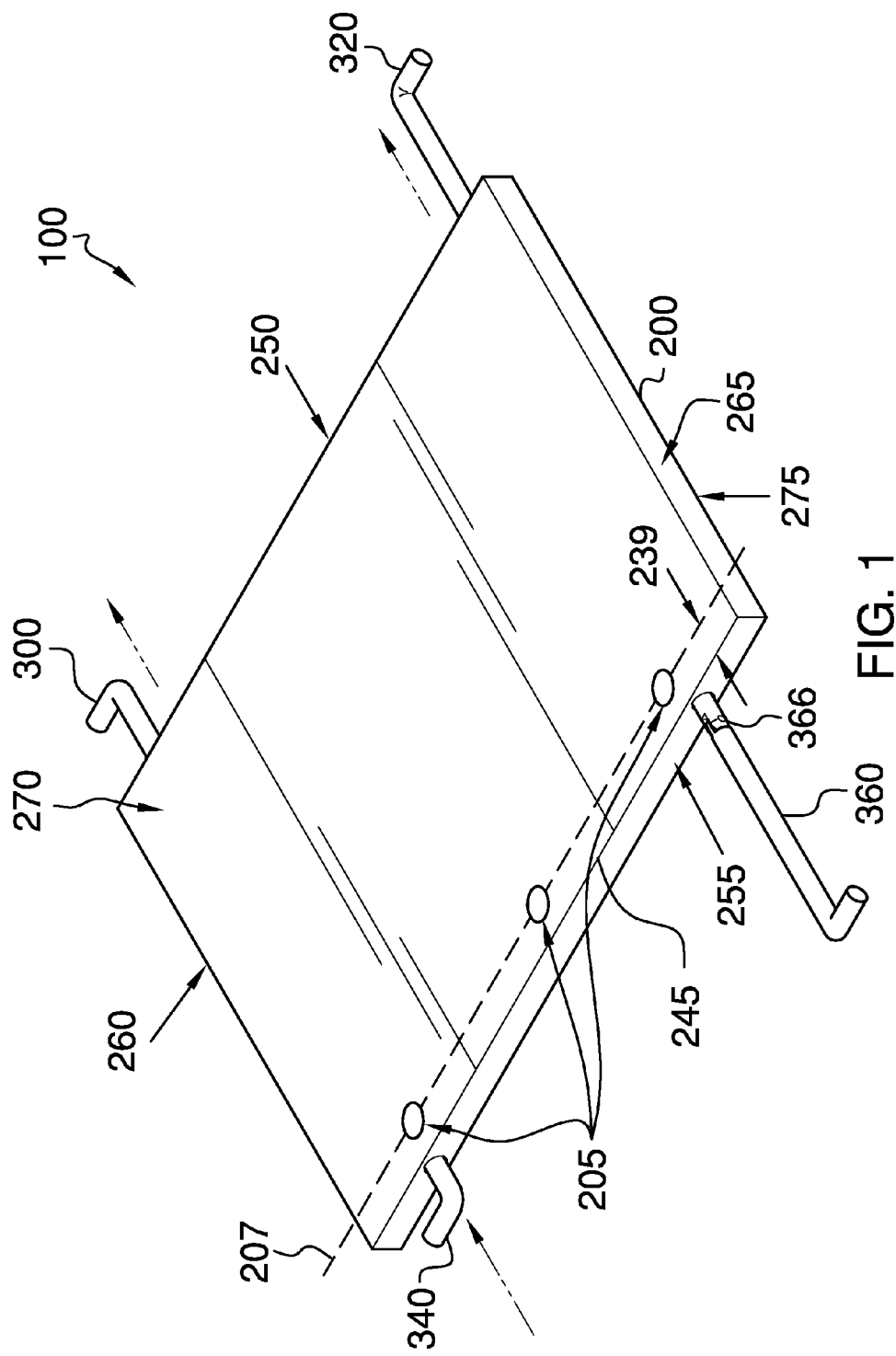
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The shopping cart desk 100 (hereinafter invention) comprises a table 200, a first leg 300, a second leg 320, a third leg 340, and a fourth leg 360. The table 200 further comprises at least two holes 205 in a pattern and spacing that is compatible with storing the table 200 inside of a multi-ring binder 400. In some embodiments, the table 200 may be approximately the size of a piece of A4 letter-size piece of paper.

The first leg 300 comprises a first leg base 302 hingedly connected to a first leg extension 308 by a first hinge joint 306. The end of the first leg base 302 that is not connected to the first hinge joint 306 widens into a first leg stop 304, which prevents the first leg 300 from sliding out of the table 200. The end of the first leg extension 308 that is not connected to the first hinge joint 306 ends at a first foot 312, which supports the invention 100 while the invention 100 is being used in a shopping cart 450. In some embodiments, the first foot 312 may be an L-shaped bend in the first leg extension 308. The first foot 312 may further comprise a protective cap (not shown) covering the end of the first foot. The first leg 300 slides into and out of a first internal cavity 310. The first internal cavity 310 lies within the table 200 and runs in a direction aligned from a front side 250 to a rear side 255. A first cavity opening 319 is located on the front side 250 of the table 200 centered from a top side 270 to a bottom side 275 and a first distance 235 from a right side 260.

A first cavity depth 315 is at least as long as the first leg 300. A first cavity width 317 is at least the diameter of the first leg stop 304, allowing the first leg stop 304 to move within the first internal cavity 310. The first cavity opening 319 is at least the width of the first leg 300 but not as wide as the diameter of the first leg stop 304. This allows the first leg 300 to be deployed from within the first internal cavity 310 but retains the first leg stop 304 within the table 200.

The second leg 320 comprises a second leg base 322 hingedly connected to a second leg extension 328 by a second hinge joint 326. The end of the second leg base 322 that is not connected to the second hinge joint 326 widens into a second leg stop 324, which prevents the second leg 320 from sliding out of the table 200. The end of the second leg extension 328 that is not connected to the second hinge joint 326 ends at a second foot 332, which supports the invention 100 while the invention 100 is being used in the shopping cart 450. In some embodiments, the second foot 332 may be an L-shaped bend in the second leg extension 328. The second foot 332 may further comprise a protective cap (not shown) covering the end of the second foot 332. The second leg 320 slides into and out of a second internal cavity 330. The second internal cavity 330 lies within the table 200 and runs in a direction aligned from the front side 250 to the rear side 255.

A second cavity opening 339 is located on the front side 250 of the table 200 centered from the top side 270 to the bottom side 275 and the first distance 235 from a left side 265. A second cavity depth 335 is at least as long as the second leg 320. A second cavity width 337 is at least the diameter of the second leg stop 324, allowing the second leg stop 324 to move within the second internal cavity 330. The second cavity opening 339 is at least the width of the second leg 320 but not as wide as the diameter of the second leg stop 324. This allows the second leg 320 to be deployed from within the second internal cavity 330 but retains the second leg stop 324 within the table 200.

The third leg 340 comprises a third leg base 342 hingedly connected to a third leg extension 348 by a third hinge joint 346. The end of the third leg base 342 that is not connected to the third hinge joint 346 widens into a third leg stop 344, which prevents the third leg 340 from sliding out of the table 200. The end of the third leg extension 348 that is not connected to the third hinge joint 346 ends at a third foot 352, which supports the invention 100 while the invention 100 is being used in the shopping cart 450. In some embodiments, the third foot 352 may be an L-shaped bend in the third leg extension 348. The third foot 352 may further comprise a protective cap (not shown) covering the end of the third foot 352. The third leg 340 slides into and out of a third internal cavity 350. The third internal cavity 350 lies within the table 200 and runs in a direction aligned from the front side 250 to the rear side 255.

A third cavity opening 359 is located on the front side 250 of the table 200 centered from the top side 270 to the bottom side 275 and a second distance 237 from the right side 260. A third cavity depth 355 is at least as long as the third leg 340. A third cavity width 357 is at least the diameter of the third leg stop 344, allowing the third leg stop 344 to move within the third internal cavity 350. The third cavity opening 359 is at least the width of the third leg 340 but not as wide as the diameter of the third leg stop 344. This allows the third leg 340 to be deployed from within the third internal cavity 350 but retains the third leg stop 344 within the table 200.

The fourth leg 360 comprises a fourth leg base 362 hingedly connected to a fourth leg extension 368 by a fourth hinge joint 366. The end of the fourth leg base 362 that is not connected to the fourth hinge joint 366 widens into a fourth leg stop 364 which prevents the fourth leg 360 from sliding out of the table 200. The end of the fourth leg extension 368 that is not connected to the fourth hinge joint 366 ends at a fourth foot 372 which supports the invention 100 while the invention 100 is being used in the shopping cart 450. In some embodiments, the fourth foot 372 may be an L-shaped bend in the fourth leg extension 368. The fourth foot 372 may further comprise a protective cap (not shown) covering the end of the fourth foot 372. The fourth leg 360 slides into and out of a fourth internal cavity 370. The fourth internal cavity 370 lies within the table 200 and runs in a direction aligned from the front side 250 to the rear side 255.

A fourth cavity opening 379 is located on the front side 250 of the table 200 centered from the top side 270 to the bottom side 275 and the second distance 237 from the left side 265. A fourth cavity depth 375 is at least as long as the fourth leg 360. A fourth cavity width 377 is at least the diameter of the fourth leg stop 364, allowing the fourth leg stop 364 to move within the fourth internal cavity 370. The fourth cavity opening 379 is at least the width of the fourth leg 360 but not as wide as the diameter of the fourth leg stop 364. This allows the fourth leg 360 to be deployed from within the fourth internal cavity 370 but retains the fourth leg stop 364 within the table 200.

The first leg 300, the second leg 320, the third leg 340, and the fourth leg 360 all hinge at, respectively, the first hinge joint 306, the second hinge joint 326, the third hinge joint 346, and the fourth hinge joint 366. This allow the invention 100 to stand on its own legs when deployed. When the four legs which were just named have been fully extended and hinged downward, the invention 100 may stand with the first foot 312, the second foot 332, the third foot 352, and the fourth foot 372 resting on a child seat 460 of the shopping cart 450.

The first internal cavity 310 and the third internal cavity 350 are laterally offset from each other so that the first internal cavity 310 and the third internal cavity 350 do not intersect inside of the table 200 and the first leg 300 and the third leg 340 do not interfere with the operation of each other. The second internal cavity 330 and the fourth internal cavity 370 are laterally offset from each other so that the second internal cavity 330 and the fourth internal cavity 370 do not intersect inside of the table 200. Moreover, the second leg 320 and the fourth leg 360 do not interfere with the operation of each other.

The at least two holes 205 lie in a straight line 207 located a third distance 239 from a rear edge 245 of the table 200. In some embodiments, the third distance 239 may be 13 mm+/−5 mm.

The at least two holes 205 allow the invention 100 to be placed into a multi-ring binder 400 retained thereby the at least two holes 205 when the invention 100 is not being used. The first leg 300, the second leg 320, the third leg 340, and the fourth leg 360, reside, respectively, in the first internal cavity 310, the second internal cavity 330, the third internal cavity 350, and the fourth internal cavity 370 when the invention 100 is not being used.

Figure 4:
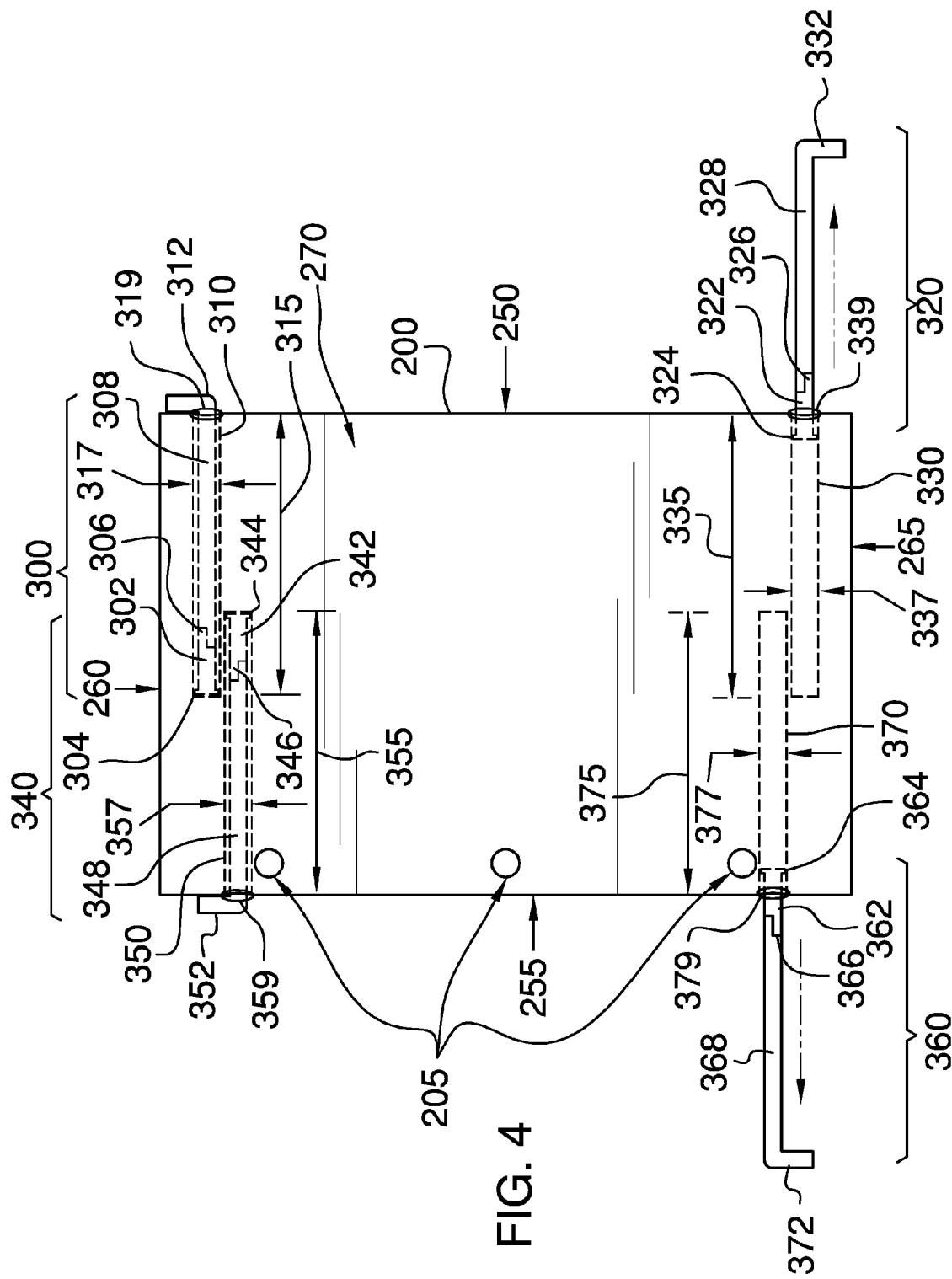
FIG. 4 is a top view of an embodiment of the disclosure.
Figure 5:
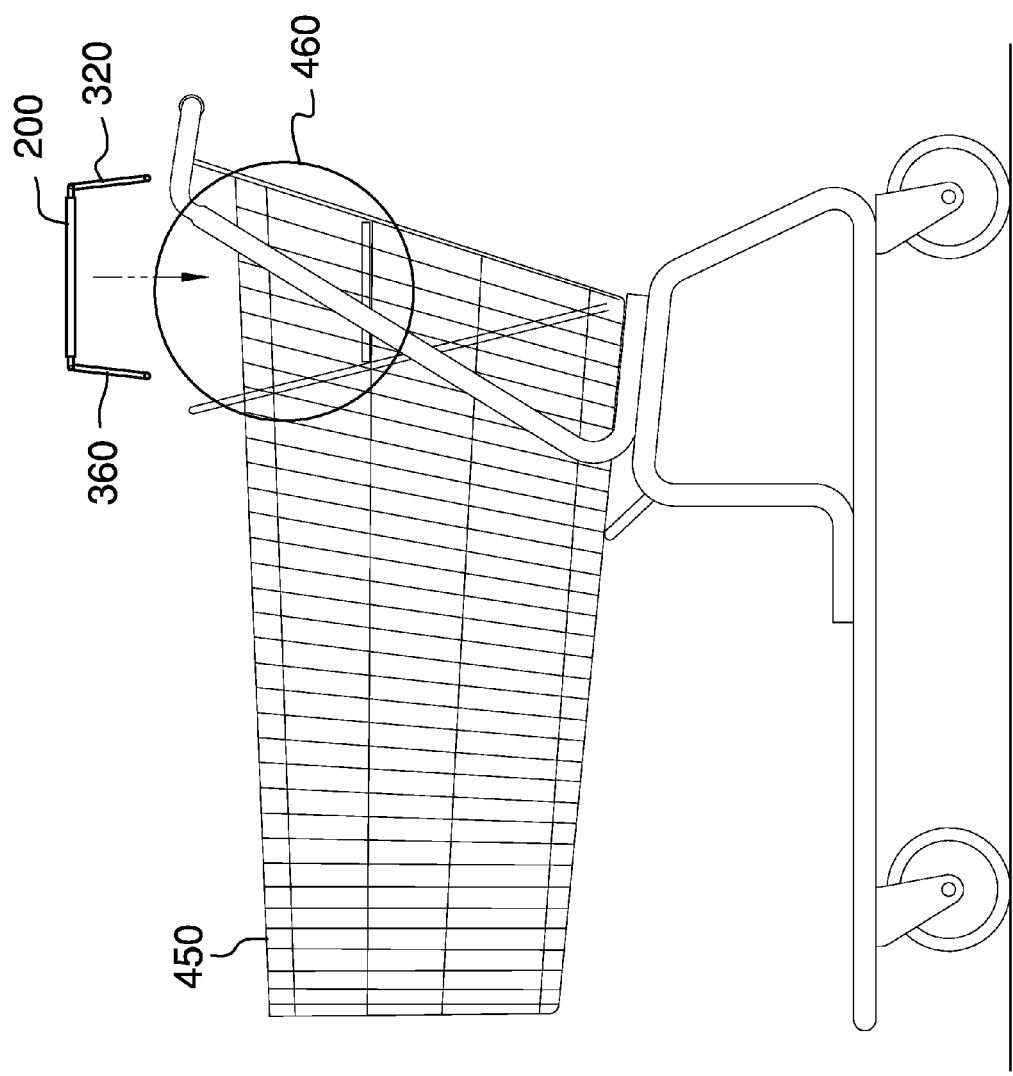
FIG. 5 is a side view of an embodiment of the disclosure being used on a shopping cart.
Figure 6:
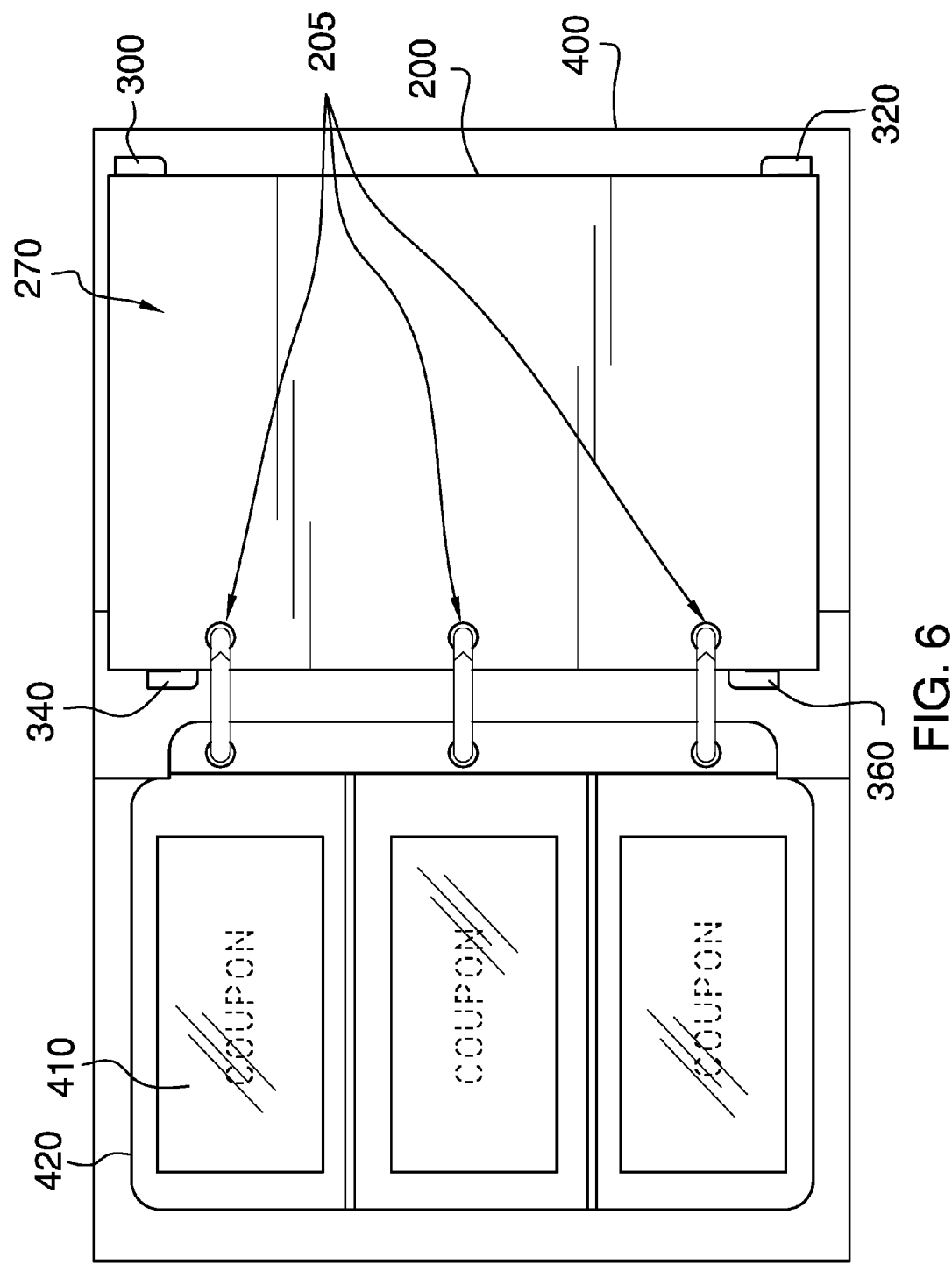
FIG. 6 is a top view illustrating an embodiment of the disclosure being stored in a ring binder.

Although FIG. 1 and FIG. 4 illustrate the invention 100 as having 3 round holes in order to be transported inside of a three-ring binder, the invention 100 is not limited in any way to being transported in a three-ring binder. FIG. 7 shows one embodiment of the invention 100 where the at least two holes 205 take the form of a first hole 530, a second hole 535, and a third hole 540 whereby the first hole 530 and the third hole 540 take the form of an elongated slot and the second hole 535 takes the form of a centrally-located, round hole.

In FIG. 7, a first ring grouping 500 illustrates the spacing and placement of rings conforming to the ISO 838 standard—a common format for ring binders in Europe. Under this standard, two rings are provided and the rings are 80 mm away from each other. In this embodiment, an ISO 838 conforming ring binder would support the invention 100 using the bottom portion of the first hole 530 and the top portion of the third hole 540.

A second ring grouping 510 illustrates the spacing and placement of a standard US three-ring binder having three rings spaced 108 mm away from each other. In this embodiment, the invention 100 would be supported in a ring binder by having the middle ring pass through the second hole 535, the top ring pass through an upper portion of the first hole 530, and the lower ring pass through a lower portion of the third hole 540.

A third ring grouping 520 illustrates another common European ring binder spacing known as "888" where a total of four rings are provided and the spacing between any two adjacent rings is 80 mm. In this embodiment, the invention 100 is supported in an "888" conforming ring binder by having two rings pass through the uppermost and lowermost portion of the first hole 530 and two rings pass through the uppermost and lowermost portions of the third hole 540.

Those skilled in the art will recognize that other variations of hole shape, size, and spacing are possible to accommodate other standard and non-standard ring binders and that such variations do not depart from the spirit and scope of the invention 100.

In use, a shopper would arrive at a grocery store and select the shopping cart 450. The shopper would open the child seat 460 of the shopping cart 450. The shopper would then remove the invention 100 from the multi-ring binder 400 by opening the rings of the multi-ring binder 400 and lifting the invention 100 out of the multi-ring binder 400. The shopper may also carry one or more coupons 410 in a coupon pocket 420, writing paper (not shown), writing instruments (not show), frequent shopper/customer loyalty cards (not shown) and other shopping accessories in the multi-ring binder 400. The shopper would then fully extend the first leg 300, the second leg 320, the third leg 340, and the fourth leg 360 and would hinge all four legs downward. The shopper would then place the invention 100 in the child seat 460 of the shopping cart 450, resting on the first foot 312, the second foot 332, the third foot 352, and the fourth foot 372. Deployed in this manner, the top side 270 presents a writing surface or workspace for organizing coupons, checking off items on a shopping list, placing a cell phone or a set of keys, and other shopping related activities. At the end of the shopping trip, the items are removed from the top side 270 of the invention 100 and the first leg 300, the second leg 320, the third leg 340, and the fourth leg 360 are straighten by repositioning them around the first hinge joint 306, the second hinge joint 326, the third hinge joint 346, or the fourth hinge joint 366, respectively. Then each leg is pushed back into the first internal cavity 310, the second internal cavity 330, the third internal cavity 350, the fourth internal cavity 370, respectively, of the table 200 and the table 200 is placed into the multi-ring binder 400. The rings are closed and the shopper leaves the store with the grocery purchase.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A shopping cart desk comprising:
   a table, a first leg, a second leg, a third leg, and a fourth leg;
   wherein the first leg slides into and out of a first internal cavity of the table;
   wherein the second leg slides into and out of a second internal cavity of the table;
   wherein the third leg slides into and out of a third internal cavity of the table;
   wherein the fourth leg slides into and out of a fourth internal cavity of the table;
   wherein the first leg comprises a first leg base hingedly connected to a first leg extension by a first hinge joint;
   wherein the end of the first leg base that is not connected to the first hinge joint widens into a first leg stop which prevents the first leg from sliding out of the table;
   wherein the end of the first leg extension that is not connected to the first hinge joint ends at a first foot which supports the shopping cart desk while the shopping cart desk is being used in a shopping cart.

2. The shopping cart desk according to claim 1
   wherein the first internal cavity lies within the table and runs in a direction aligned from a front side to a rear side of the table;
   wherein a first cavity opening is located on the front side of the table centered from a top side to a bottom side and a first distance from a right side.

3. The shopping cart desk according to claim 2
   wherein a first cavity depth is at least as long as the first leg;
   wherein a first cavity width is at least the diameter of the first leg stop, allowing the first leg stop to move within the first internal cavity;
   wherein the first cavity opening is at least the width of the first leg but not as wide as the diameter of the first leg stop, allowing the first leg to be deployed from within the first internal cavity but retaining the first leg stop within the table.

4. The shopping cart desk according to claim 3
   wherein the second leg comprises a second leg base hingedly connected to a second leg extension by a second hinge joint;
   wherein the end of the second leg base that is not connected to the second hinge joint widens into a second leg stop which prevents the second leg from sliding out of the table;
   wherein the end of the second leg extension that is not connected to the second hinge joint ends at a second foot which supports the shopping cart desk while the shopping cart desk is being used in the shopping cart.

5. The shopping cart desk according to claim 4
wherein the second internal cavity lies within the table and runs in a direction aligned from the front side to the rear side;
wherein a second cavity opening is located on the front side of the table centered from the top side to the bottom side and the first distance from a left side.

6. The shopping cart desk according to claim 5
wherein a second cavity depth is at least as long as the second leg;
wherein a second cavity width is at least the diameter of the second leg stop, allowing the second leg stop to move within the second internal cavity;
wherein the second cavity opening is at least the width of the second leg but not as wide as the diameter of the second leg stop allowing the second leg to be deployed from within the second internal cavity but retaining the second leg stop within the table.

7. The shopping cart desk according to claim 6
wherein the third leg comprises a third leg base hingedly connected to a third leg extension by a third hinge joint;
wherein the end of the third leg base that is not connected to the third hinge joint widens into a third leg stop which prevents the third leg from sliding out of the table;
wherein the end of the third leg extension that is not connected to the third hinge joint ends at a third foot which supports the shopping cart desk while the shopping cart desk is being used in the shopping cart.

8. The shopping cart desk according to claim 7
wherein the third internal cavity lies within the table and runs in a direction aligned from the front side to the rear side;
wherein a third cavity opening is located on the front side of the table centered from the top side to the bottom side and a second distance from the right side.

9. The shopping cart desk according to claim 8
wherein a third cavity depth is at least as long as the third leg;
wherein a third cavity width is at least the diameter of the third leg stop, allowing the third leg stop to move within the third internal cavity;
wherein the third cavity opening is at least the width of the third leg but not as wide as the diameter of the third leg stop, allowing the third leg to be deployed from within the third internal cavity but retaining the third leg stop within the table.

10. The shopping cart desk according to claim 9
wherein the fourth leg comprises a fourth leg base hingedly connected to a fourth leg extension by a fourth hinge joint;
wherein the end of the fourth leg base that is not connected to the fourth hinge joint widens into a fourth leg stop which prevents the fourth leg from sliding out of the table;
wherein the end of the fourth leg extension that is not connected to the fourth hinge joint ends at a fourth foot which supports the shopping cart desk while the shopping cart desk is being used in the shopping cart.

11. The shopping cart desk according to claim 10
wherein the fourth internal cavity lies within the table and runs in a direction aligned from the front side to the rear side;
wherein a fourth cavity opening is located on the front side of the table centered from the top side to the bottom side and the second distance from the left side.

12. The shopping cart desk according to claim 11
wherein a fourth cavity depth is at least as long as the fourth leg;
wherein a fourth cavity width is at least the diameter of the fourth leg stop, allowing the fourth leg stop to move within the fourth internal cavity;
wherein the fourth cavity opening is at least the width of the fourth leg but not as wide as the diameter of the fourth leg stop, allowing the fourth leg to be deployed from within the fourth internal cavity but retaining the fourth leg stop within the table.

13. The shopping cart desk according to claim 12
wherein the first foot is an L-shaped bend in the first leg extension;
wherein the second foot is an L-shaped bend in the second leg extension;
wherein the third foot is an L-shaped bend in the third leg extension;
wherein the fourth foot is an L-shaped bend in the fourth leg extension.

14. The shopping cart desk according to claim 13
wherein the table further comprises at least two holes in a pattern and spacing compatible with storing the table inside of a multi-ring binder by passing rings from the multi-ring binder through the at least two holes;
wherein the at least two holes lie in a straight line located a third distance from a rear edge of the table.

15. The shopping cart desk according to claim 14
wherein the table is approximately the size of a piece of A4 letter-size piece of paper.

16. The shopping cart desk according to claim 15
wherein the first leg, the second leg, the third leg, and the fourth leg all hinge at, respectively, the first hinge joint, the second hinge joint, the third hinge joint, and the fourth hinge joint, allowing the shopping cart desk to stand on its own when deployed;
wherein with the first leg, the second leg, the third leg, and the fourth leg fully extended and hinged downward, the shopping cart desk stands with the first foot, the second foot, the third foot, and the fourth foot resting on a child seat of the shopping cart.

17. The shopping cart desk according to claim 16
wherein the first internal cavity and the third internal cavity are laterally offset from each other so that the first internal cavity and the third internal cavity do not intersect inside of the table and the first leg and the third leg do not interfere with the operation of each other;
wherein the second internal cavity and the fourth internal cavity are laterally offset from each other so that the second internal cavity and the fourth internal cavity do not intersect inside of the table and the second leg and the fourth leg do not interfere with the operation of each other.

18. The shopping cart desk according to claim 17
wherein the at least two holes take the form of a first hole, a second hole, and a third hole;
wherein the first hole is an elongated slot;
wherein the third hole is an elongated slot;
wherein the second hole is a centrally-located, round hole.

* * * * *